United States Patent
Naka et al.

(10) Patent No.: US 10,220,396 B2
(45) Date of Patent: Mar. 5, 2019

(54) NOZZLE PIPE

(71) Applicant: MAKITA CORPORATION, Aichi (JP)

(72) Inventors: Shinsuke Naka, Aichi (JP); Tomonobu Nashimoto, Aichi (JP); Yoshinori Shibata, Aichi (JP)

(73) Assignee: MAKITA CORPORATION, Aichi (JP)

(*) Notice: Subject to any disclaimer, the term of this patent is extended or adjusted under 35 U.S.C. 154(b) by 0 days.

(21) Appl. No.: 14/744,403

(22) Filed: Jun. 19, 2015

(65) Prior Publication Data

US 2015/0366424 A1 Dec. 24, 2015

(30) Foreign Application Priority Data

Jun. 20, 2014 (JP) ................................. 2014-127504

(51) Int. Cl.
*B05B 1/34* (2006.01)
*E01H 1/08* (2006.01)
*A01G 20/47* (2018.01)

(52) U.S. Cl.
CPC ................ *B05B 1/34* (2013.01); *A01G 20/47* (2018.02); *E01H 1/0809* (2013.01)

(58) Field of Classification Search
CPC . A47L 5/14; A47L 5/24; A47L 9/0081; A47L 9/08; A47L 9/02; B08B 2205/00;
(Continued)

(56) References Cited

U.S. PATENT DOCUMENTS 550,336 A * 11/1895 Williams ................ B05B 1/341
239/489

2,122,211 A * 6/1938 Mills, Jr. ................ F01B 25/00
239/590.5
(Continued)

FOREIGN PATENT DOCUMENTS

JP 46-023004 8/1971
JP 53-035170 3/1978
(Continued)

OTHER PUBLICATIONS

Office Action issued in Japan Counterpart Patent Appl. No. 2014-127504, dated May 1, 2018, along with an English translation thereof.

*Primary Examiner* — Steven J Ganey
*Assistant Examiner* — Christopher R Dandridge
(74) *Attorney, Agent, or Firm* — Greenblum & Bernstein, P.L.C.

(57) ABSTRACT

A nozzle pipe is to be coupled to a distal open end of an air blow-off tube of a blower apparatus for regulating the profile of an airflow blown out from the blow-off tube. The nozzle pipe comprises an outer tubular member and an inner tubular member coaxially disposed within the outer tubular member. The inner tubular member has a circumferential wall formed with apertures allowing air passage therethrough. The outer tubular member and the inner tubular member provides a first space therebetween to form a first air passage, while the inner tubular member provides a second space therein to form a second air passage. A plurality of rectifier fins are disposed inward from the outer tubular member, standing radially and extending longitudinally, and spaced apart circumferentially from each other. The fins extend inclined at an angle with reference to the longitudinal central axis of the tubular members.

15 Claims, 4 Drawing Sheets

(58) Field of Classification Search
CPC .. B08B 5/02; B08B 9/093; B05B 1/34; B05B 1/3402; B05B 1/3405; B05B 7/2402; B05B 7/2475; B05B 9/08; B05B 1/28; B05B 1/262; B05B 1/265; A01G 1/125; E01H 1/0809
USPC ...... 15/328, 329, 330, 344, 405, 414, 415.1; 239/589, 590, 592, 596, DIG. 6, 152–154, 239/499–502, 594, 462, 487, 489, 590.5
See application file for complete search history.

(56) References Cited

U.S. PATENT DOCUMENTS

| | | | | |
|---|---|---|---|---|
| 3,486,700 | A * | 12/1969 | Bristow | B65G 53/00 239/590.5 |
| 6,324,720 | B1 * | 12/2001 | Beckey | A47L 5/14 15/326 |
| 8,418,437 | B2 * | 4/2013 | Oba | B64D 29/06 60/226.1 |
| 9,656,282 | B2 * | 5/2017 | Lehmann | B05B 1/14 |
| 2008/0260517 | A1 | 10/2008 | Hayashigaito et al. | |
| 2012/0096672 | A1 * | 4/2012 | Hatano | A01G 20/43 15/405 |

FOREIGN PATENT DOCUMENTS

| | | |
|---|---|---|
| JP | 06-015747 | 3/1994 |
| JP | 07-35098 | 2/1995 |
| JP | 2008-267201 | 11/2008 |
| JP | 2012-501714 | 1/2012 |
| JP | 2013-245570 | 12/2013 |
| JP | 2014-98320 | 5/2014 |
| WO | 2010/026531 | 3/2010 |

* cited by examiner

NOZZLE PIPE

TECHNICAL FIELD

The present invention relates to a nozzle pipe for a blower apparatus, and more particularly to a nozzle pipe to be coupled to a distal open end of an air blow-off tube of a blower apparatus and having an airflow rectifying arrangement in order to shape up the profile of an airflow coming out from the blow-off tube.

BACKGROUND INFORMATION

Blower apparatuses have been conventionally known and used for blowing off fallen leaves on the ground or the like. An example of blower apparatuses is disclosed in JP 2013-245,570 A, in which the blower apparatus comprises a blower unit mounted on a back carrier frame and a blow-off tube connected to the blower unit, and blows out air from the distal open end of the blow-off tube to blow off fallen leaves on the ground or the like. In a conventional configuration, however, the profile of the jetting-out airflow depends simply on the diameter of the open end of the blow-off tube, and the breadth of the jetting-out airflow is accordingly limited to a certain narrow extent. In case a broader airflow (air jet) is wanted, a nozzle pipe having a larger outlet diameter may be attached to the distal end of the blow-off tube to produce a broader air jet output. However, attaching a larger size nozzle tube would make the apparatus bulky and worse-looking.

SUMMARY OF THE INVENTION

In view of the foregoing circumstances, therefore, it is a primary object of the present invention to provide a nozzle pipe to be coupled to a distal open end of an air blow-off tube of a blower apparatus and having an airflow rectifying arrangement in order to regulate or shape up the profile of the air jet output.

According to the present invention, the object is accomplished by providing a nozzle pipe to be coupled to a distal open end of an air blow-off tube of a blower apparatus, the nozzle pipe comprising: an outer tubular member having an inlet opening and an outlet opening defining a longitudinal central axis through the inlet opening and the outlet opening; and a plurality of rectifier fins disposed inward from the outer tubular member, standing radially and extending longitudinally, and spaced apart circumferentially from each other.

With a blower apparatus to which is coupled a nozzle pipe configured as above in which a plurality of rectifier fins are disposed inward from the outer tubular member, standing radially and extending longitudinally, and spaced apart circumferentially from each other, the flow direction of the peripheral portion of the air jet output (i.e. cylindrical airflow) is oriented by the rectifier fins to produce an air jet output with a regulated or shaped-up profile, i.e. a controlled breadth.

According to the present invention, the rectifier fins may extend inclined at an angle with reference to the longitudinal central axis such that the fins are curved circumferentially along the inner wall surface as they extend toward the outlet opening. Then, the peripheral portion of the cylindrical airflow in the nozzle pipe is oriented aslant to whirl helically. With such a configuration, the peripheral portion of the airflow jetting out from the outlet opening is deflected tangentially, and the profile of the air jet output is broadened accordingly. The inclination angle of the rectifier fins with reference to the longitudinal central axis may be set to increase as the fins extend nearer to the outlet opening or may be set to be constant throughout the extension of the rectifier fins. The angle of the inclination may preferably be set between 10 degrees and 30 degrees at the outlet opening of the tubular member. The plurality of rectifier fins may be disposed equally spaced apart circumferentially so that the airflow jetting out from the outlet opening will be regulated uniformly in the circumferential direction. The number of rectifier fins may preferably be three to eight for deflecting the peripheral portion airflow effectively.

According to the present invention, the nozzle pipe may further comprise an inner tubular member coaxially disposed within the outer tubular member, wherein the inner tubular member has a circumferential wall formed with apertures allowing air to pass therethrough from inside to outside, an inlet opening adapted to be coupled to the distal open end of the air blow-off tube and an outlet opening formed in parallel with the outlet opening of the outer tubular member, wherein the outer tubular member and the inner tubular member provides a first space therebetween to form a first air passage, and the inner tubular member provides a second space therein to form a second air passage, wherein the rectifier fins are disposed in the first air passage between the outer tubular member and the inner tubular member. A part of the airflow coming out from the blow-off tube of the blower apparatus will flow through the apertures in the circumferential wall of the inner tubular member into the first air passage between the outer tubular member and the inner tubular member and flow toward the outlet opening being deflected helically by the rectifier fins on the one hand, and the remainder of the airflow from the blow-off tube will flow through the second air passage within the inner tubular member directly on the other hand. The rectifier fins may be fixed on the inner wall surface of the outer tubular member directing inward, or on the outer wall surface of the inner tubular member directing outward. Thus, a straightforward airflow will be jetted out from the outlet opening of the inner tubular member, while a helically whirling air will be jetted out from between the outlet opening of the outer tubular member and the outlet opening of the inner tubular member thereby forming a broadened profile of the airflow.

BRIEF DESCRIPTION OF THE DRAWINGS

For a better understanding of the present invention, and to show how the same may be practiced and will work, reference will now be made, by way of example, to the accompanying drawings, in which.

DETAILED DESCRIPTION OF EMBODIMENTS OF THE INVENTION

The invention and its embodiments can now be better understood by turning to the following detailed description of the preferred embodiments with reference to the accompanying drawings. The invention will hereunder be described about a backpack blower apparatus to which an embodiment of the nozzle pipe according to the present invention is coupled. It should be understood, however, that the present invention is applicable not only to a backpack blower apparatus, but also to a hand-held blower apparatus. Further, the invention is applicable not only to an apparatus with an internal combustion engine, but also an apparatus with an electric motor.

Figure 1:
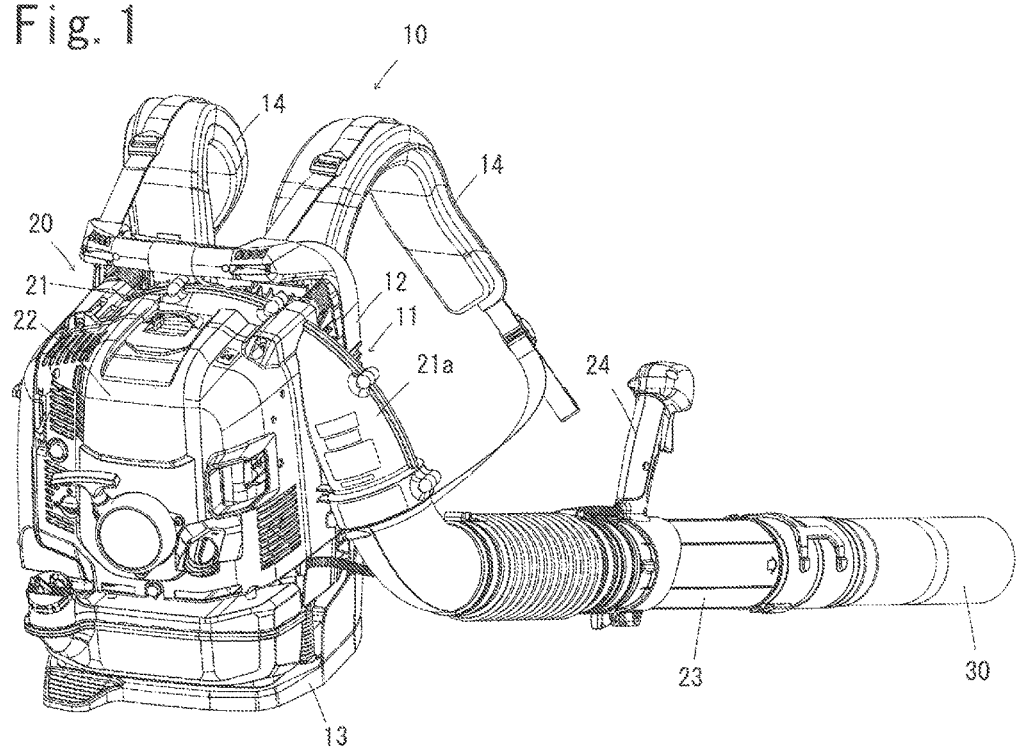
FIG. 1 is a perspective view, as seen from the rear right side, of a backpack blower apparatus with an embodiment of the nozzle pipe according to the present invention coupled to the distal open end of the blow-off tube of the blower apparatus.

FIG. 1 shows an overall view of a backpack blower apparatus 10 coupled with a nozzle pipe according to an embodiment of the present invention, as viewed from the right rear side. The blower apparatus 10 comprises a back carrier frame 11, a blower unit 20 mounted on the back carrier frame 11, and a blow-off tube (airflow tube) 23 connected to a blow-out duct (airflow duct) 21a of the blower unit 20, wherein a nozzle pipe 30 according to the present invention is coupled to the distal open end of the blow-off tube 23.

The back carrier frame 11 serves for the operator to piggyback the blower unit 20, and includes a back contacting member 12 to be disposed vertically along the back of the operator and a base member 13 extending horizontally rearward from the lower edge of the back contacting member 12, exhibiting an L-shaped side view. To the back contacting member 12 are fixed a right-and-left pair of shoulder straps 14 so that the operator can piggyback the back carrier frame 11. The base member 13 is to support the blower unit 20 thereon.

As shown in FIG. 1, the blower unit 20 includes a volute casing 21, an air blowing fan (not shown) rotatably supported in the volute casing 21, and an internal combustion engine 22 mounted to the volute casing 21 to drive the blowing fan. The volute casing 21 is formed with a blow-out duct 21a on the right side thereof, as shown in FIG. 1, so that the air sucked in from the ambiance by the blower unit 20 is blown out from the blow-out duct 21a, which in turn is coupled to the proximal opening of the blow-off tube 23. The blow-off tube 23 is provided with a grip handle 24 near the middle point of its length for the operator to hold and manipulate the blow-off tube 23 while operating the blower apparatus 10.

To the outlet opening end of the blow-off tube 23 is coupled a nozzle pipe 30 as shown in FIG. 1. The nozzle pipe 30 is so designed and configured to control at will the flow speed and the breadth of the air coming out from the outlet opening thereof. An embodiment of the nozzle pipe 30 is illustrated in FIGS. 2a through 4b. The nozzle pipe 30 comprises an inner tubular member 31 with an inlet opening coupled to the distal end of the blow-off tube 23 to communicate therewith and an outer tubular member 34 surrounding the inner tubular member 31 to form an air passage in between (herein, "in-between air passage") as separated from the atmosphere. The inner tubular member 31 has a tapered portion 31a from the inlet opening up to the approximately middle point of the length of the inner tubular member 31 and a narrow portion 31b (approximately ⅔ in diameter of the outer tubular member) from the distal end of the tapered portion 31a up to the outlet opening of the nozzle pipe 30. The tapered portion 31a is formed with four apertures 32 equally spaced apart from each other in the circumferential direction of the tapered portion 31a. Each of the apertures is shaped in a trapezoid narrowing toward the narrow portion 31b to meet the slope of the tapered portion 31a. The size (width) of each aperture 32 is 12.5% in the circumferential direction so that the total amount of the apertures (gross aperture rate) comes to 50% of the circumference of the tapered portion 31a.

Figure 4A:
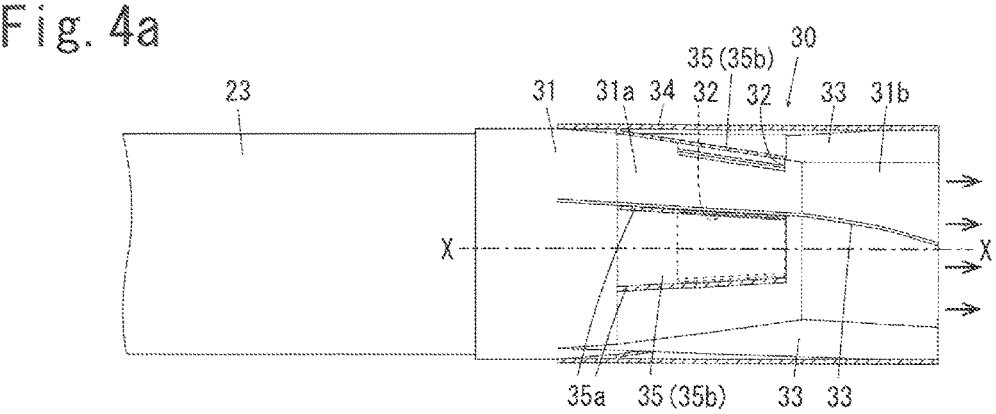
FIG. 4a is a side view of the nozzle pipe of FIG. 2a with the outer tubular member shown in cross-section to show the inner tubular member with the apertures closed by the shutter mechanisms.
Figure 4B:
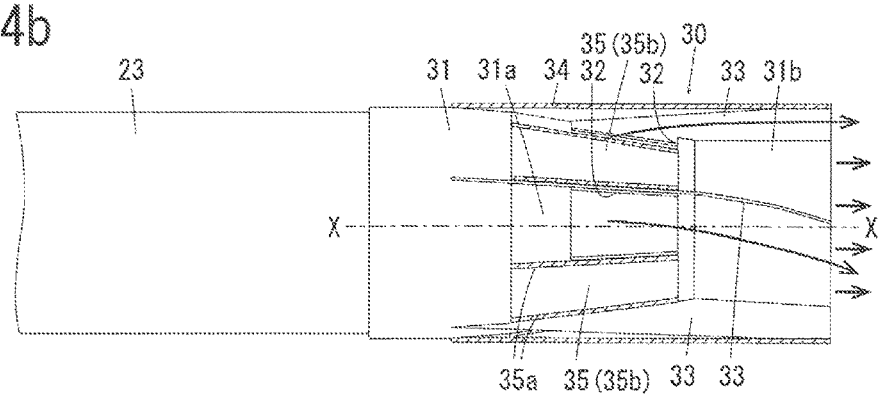
FIG. 4b is a side view of the nozzle pipe of FIG. 3a with the outer tubular member shown in cross-section to show the inner tubular member with the apertures not closed by the shutter mechanisms.

As seen in FIGS. 4a and 4b, rectifier fins 33 are disposed on the outer wall surface of the inner tubular member 31. The rectifier fins 33 extend longitudinally from the inlet opening to the outlet opening on the outer wall surface of the inner tubular member 31, standing radially outward. Further, each of the rectifier fins 33 extends inclined at an angle with reference to the longitudinal central axis X-X of the inner tubular member 31. The inclination angle is 5 degrees on the tapered portion 31a, gradually increases thereafter and reaches 20 degrees at the outlet opening of the inner tubular member 31.

As shown in FIGS. 2a through 4b, the outer tubular member 34 surrounds the inner tubular member 31 to form an annular air passage in between shutting out the atmosphere. The outer tubular member 34 is formed in the shape of a hollow cylindrical body of substantially the same diameter along its longitudinal axis X-X and is coupled to the outer wall surface of the inlet opening part of the inner tubular member 31 turnable and airtight. The outer tubular member 34 is provided on its inner circumference with shutter mechanisms 35 for closing the apertures 32 of the inner tubular member 31. The shutter mechanisms 35 are formed to project toward the outer circumferential wall of the inner tubular member 31 at the positions confronting the apertures 32. Each of the shutter mechanism 35 includes two leg members 35a standing from the inner surface of the outer tubular member 34 and approaching the outer surface of the inner tubular member 31 at the side edges of each of the apertures 32, and a shutter plate 35b in substantially the same shape as the aperture 32 supported between the two leg members 35a. The shutter mechanisms 35 are disposed on the inner circumference of the outer tubular member 32 equally spaced apart from each other in the circumferential direction, respectively corresponding to the apertures 32 in the inner tubular member 31.

Hereunder will be described how the blower apparatus 10 coupled with the nozzle pipe 30 as explained above works. The operator starts the engine 22 and piggyback the back carrier frame 11. Then, the operator grasps the grip handle 24 of the blow-off tube 23 with his/her right hand and direct the blow-off tube 23 coupled at its distal end with the nozzle pipe 30 to jet out air toward fallen leaves or the like on the ground. In the case of blowing off wet fallen leaves sticking on the ground as after the rain, a strong airflow at a higher speed should be blown out from the nozzle pipe 30, while in the case of blowing off dry fallen leaves in a broad range on the ground, a broad airflow in a larger diameter had better be blown out from the nozzle 30.

Figure 2A:
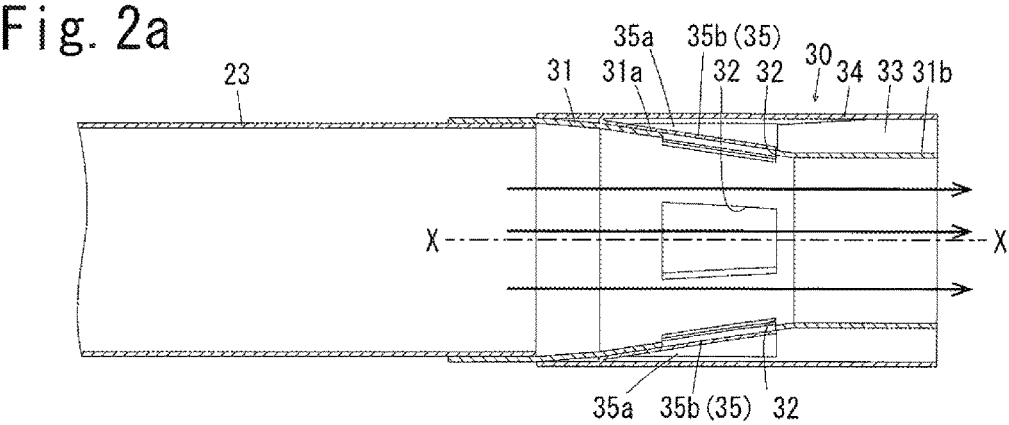
FIG. 2a is a sectional view of a nozzle pipe taken along the longitudinal central axis thereof, with apertures in the inner tubular member closed by the shutter mechanism.
Figure 2B:
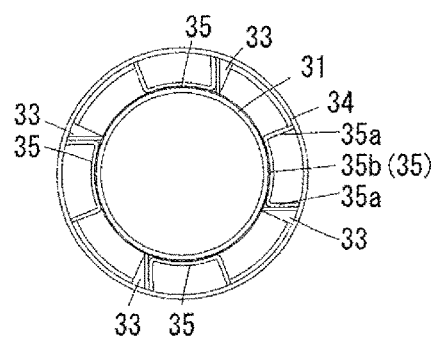
FIG. 2b is an end view of the nozzle pipe of FIG. 2a as seen from the outlet open end thereof.

More specifically, where a strong airflow at a higher speed is to be blown out from the nozzle pipe 30, the outer tubular member 34 is turned with respect to the inner tubular member 31 to the position as shown in FIGS. 2a, 2b and 4a, so that the shutter mechanisms 35 of the outer tubular member 34 confront the apertures 32 of the inner tubular member 31, whereby the shutter mechanisms 35 close the apertures 32. Then, all the air blown out from the blow-off tube 23 into the inner tubular member 31 passes through the narrow portion 31b of the inner tubular member 31 and is jetted out from the outlet opening of the inner tubular member 31. As the diameter of the inner tubular member 31 at its outlet opening is smaller than that of the blow-off tube 23, the wind speed of the air jetting out from the nozzle is higher than that of the air which would come out from the blow-off tube 23 without the nozzle pipe 30 coupled thereto.

Figure 3A:
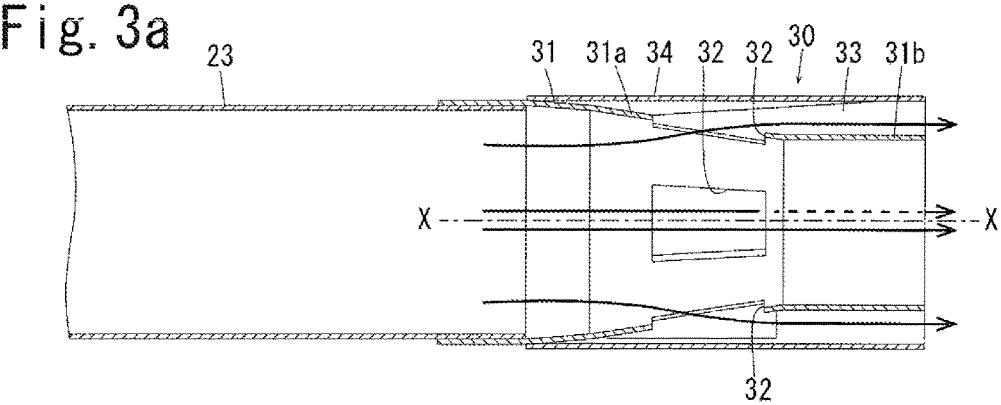
FIG. 3a is a sectional view of a nozzle pipe taken along the longitudinal central axis thereof, with the apertures in the inner tubular member not closed by the shutter mechanism.
Figure 3B:
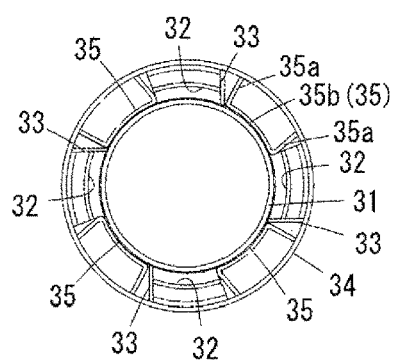
FIG. 3b is an end view of the nozzle pipe of FIG. 3a as seen from the outlet open end thereof.

When a broad airflow is to be blown out from the nozzle pipe 30 spreading radially outward, the outer tubular member 34 is turned with respect to the inner tubular member 31 by 40 degrees from the position where the shutter mechanisms 35 close the apertures 32 totally to the position where the shutter mechanisms 35 uncover the apertures 32 as shown in FIGS. 3a, 3b and 4b. As the outer tubular member 34 is turned with respect to the inner tubular member 31, each of the shutter mechanisms 35 is shifted circumferentially apart from the corresponding aperture 32 to uncover the aperture 32. While most of the airflow from the blow-off tube 23 passes through the inner tubular member 31 to be blown out from the outlet opening thereof, some part of the airflow from the blow-off tube 23 is introduced through the apertures 32 into the in-between air passage between the inner tubular member 31 and the outer tubular member 34, passes therethrough and is blown out from between the outlet opening of the inner tubular member 31 and the outlet opening of the outer tubular member 34. As some part of the airflow from the blow-off tube 23 is introduced into the in-between air passage through the apertures 32, the wind speed of the air blown out from the outlet opening of the inner tubular member 31 under this condition is lower than the wind speed of the blown-out air when the apertures 32 are closed, on the one hand. But on the other hand, the air introduced into the in-between air passage flows therethrough and is deflected circumferentially by and along the inclined rectifier fins 33 to gain tangential component of the flow direction, and whirls out from the annular in-between outlet opening of the nozzle 30. Thus, the profile of the airflow coming out from the nozzle 30 pipe is broader in diameter than the case without the rectifier fins 33.

The wind speed and the breadth of the air blown out from the nozzle pipe 30 can be arbitrarily controlled by adjusting the opened areas of the apertures 32, by circumferentially turning the outer tubular member 34 with respect to the inner tubular member 31 to partly (i.e. to an intended extent) close the apertures 32 by means of the shutter mechanisms 35. For example, where each of the shutter mechanisms 35 covers a half area of the corresponding aperture 32 and uncovers the remaining half area thereof, the amount of the air introduced from the inner tubular member 31 into the in-between air passage through the apertures 32 will be suppressed to about a half of that in the case of fully opening the apertures 32. When the amount of the air introduced into the in-between air passage is suppressed to about a half of that in the case of fully opening the apertures 32, the airflow coming out from the outlet opening of the inner tubular member 31 will be slower than the airflow under the fully closed condition (i.e. faster than the airflow under the fully opened condition), but the air will be blown out broadly from the nozzle pipe 30 with the air through the in-between air passage additionally coming out from the annular outlet opening between the outer tubular member 34 and the inner tubular member 31. The opened area of the apertures 32 can be arbitrarily adjusted by changing the angle of circumferentially turning the outer tubular member 34 with respect to the inner tubular member 31. As the apertures 32 are opened wider, the wind speed of the airflow coming out from the outlet opening of the inner tubular member 31 will be slower, but the profile of the airflow blown out from the nozzle pipe 30 will be broader with the increase of the airflow from the annular outlet opening of the in-between air passage. As the apertures 32 are opened narrower, the airflow from the annular outlet opening of the in-between air passage will decrease to make the profile of the airflow blown out from the nozzle pipe 30 less broad, but the wind speed of the airflow coming out from the outlet opening of the inner tubular member 31 will be faster.

In the above described embodiment, the nozzle 30 is provided with four rectifier fins 33 extending longitudinally at an angle with reference to the longitudinal central axis X-X and standing radially within the outer tubular member 34. By disposing the rectifier fins 33 on the outer wall surface of the inner tubular member 31 toward the inner wall surface of the outer tubular member 34, the rectifier fins 33 are disposed substantially inward from the outer tubular member 34. With this configuration, the peripheral portion of the airflow within the nozzle 30 is given orientation to form the profile of the airflow blown out from the nozzle 30. While the rectifier fins 33 are disposed on the outer wall surface of the inner tubular member 31 standing toward the inner wall surface of the outer tubular member 34 in the above described embodiment, the present invention is not necessarily limited to such a configuration, but can be practiced by disposing the fins 33 on the inner wall surface of the outer tubular member 34 standing inward toward the outer wall surface of the inner tubular member 31 and extending longitudinally to realize the same function.

Figure 5:
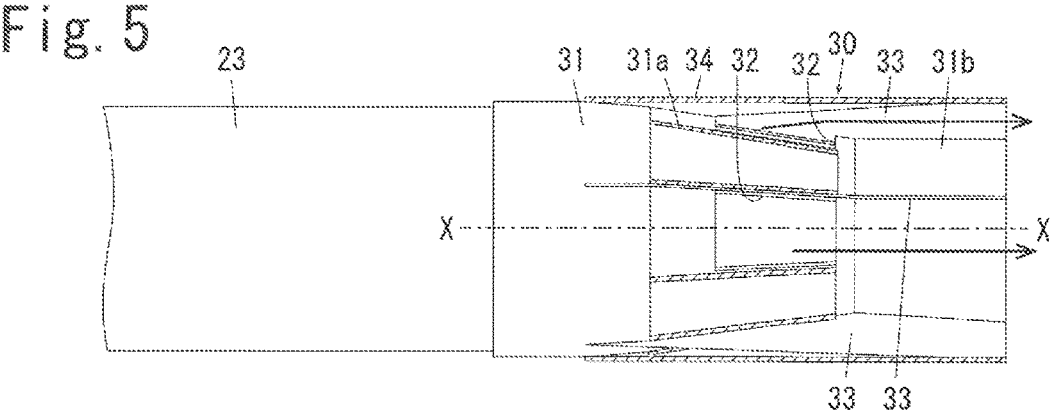
FIG. 5 is a side view of a nozzle pipe similar to FIG. 4b but with the rectifier fins extending straight in parallel to the longitudinal central axis.

In the embodiment of the present invention shown in FIGS. 4a and 4b, the rectifier fins 33 provided on the outer wall surface of the inner tubular member 31 is inclined at an angle with reference to the longitudinal central axis X-X of the inner tubular member 31. Thanks to the inclination of the rectifier fins 31, the air flowing through the in-between air passage is oriented aslant to travel helically and whirl out from the outlet opening of the nozzle pipe 30. Thus, the profile of the airflow blown out from the nozzle pipe 30 has a radially expanded breadth. The inclination angle of the rectifier fin 33 with reference to the longitudinal central axis X-X is made greater at the outlet opening than at the inlet opening in the illustrated embodiment, but is not necessarily limited to this configuration, and may be constant from the inlet end to the outlet end. In the illustrated embodiment, the inclination angle is 20 degrees at the outlet end. This configuration serves to keep an adequate forward flow of the air and an adequate radial breadth of the air blowout. The inclination angle of the rectifier fin 33 at the outlet end is not necessarily limited to 20 degrees, but may be in the range of 10 through 30 degrees for the airflow coming out from the outlet of the in-between air passage of the nozzle pipe 30 with an adequate forward flow and an adequate radial breadth. While the nozzle pipe 30 is capable of giving an adequate breadth to the blown-out airflow, the size of the nozzle pipe 30 is not particularly larger than the blow-off tube 23, which will not deteriorates the appearance of the blower apparatus 10. In stead of extending inclined at an angle with reference to the longitudinal central axis X-X, the rectifier fins 33 may be configured to extend in parallel (i.e. not inclined at an angle) to the longitudinal central axis X-X as shown in FIG. 5. This configuration will serve to direct the airflow straight forward along the longitudinal central axis X-X.

The four rectifier fins 33 arranged equally spaced apart from each other in the circumferential direction serve to uniformly rectify or orient the airflow through the in-between air passage between the inner tubular member 31 and the outer tubular member 34, and in turn to uniformly expand the breadth of the blown-out air jet. The number of rectifier fins 34 is not necessarily limited to four, but may arbitrarily be three to eight in order to serve a useful function.

According to the illustrated embodiment, the nozzle pipe 30 comprises an inner tubular member 31 coupled to the distal open end of the blow-off tube 23 and an outer tubular member 34 surrounding the inner tubular member 31 to form an in-between air passage separated from the atmosphere, wherein the inlet opening of the outer tubular member 34 is coupled to the outer wall surface of the inlet part of the inner tubular member 31 turnable and airtight. The inner tubular member 31 is formed with apertures 32 in the circumferential wall of the tapered portion 31a for communicating air into the in-between air passage, and the outer tubular member 34 is provided on its inner circumferential wall with shutter mechanisms 35 for closing the apertures 32, wherein the shutter mechanisms 35 will adjustably close the apertures 32 by circumferentially turning the outer tubular member 34 with reference to the inner tubular member 31. When the shutter mechanisms 35 close the apertures 32 totally, the air is not introduced into the in-between air passage, and a strong and fast airflow will be blown out from the outlet opening of the inner tubular member 31.

When the outer tubular member 34 is turned by 40 degrees with reference to the inner tubular member 31 from the position where the shutter mechanisms 35 totally close the apertures 32 to the position where the shutter mechanisms 35 uncover the apertures 32, part of the airflow in the inner tubular member 31 is introduced through the apertures 32 into the in-between air passage between the inner tubular member 31 and the outer tubular member 34 so that air will be blown out from the annular outlet opening of the in-between air passage radially broadly but with a reduced wind speed.

When the outer tubular member 34 is turned by an arbitrary angle between 0 and 40 degrees, the opened area (uncovered area) of the apertures 32 can be adjusted so that the wind speed and the radial breadth of the air blown out from the nozzle pipe 30 can be arbitrarily adjusted.

As the nozzle pipe 30 of the illustrated embodiment can blow out both a fast and narrow airflow and a slow and broad airflow, and arbitrarily adjusting in-between, by merely turning the outer tubular member 34 circumferentially with reference to the inner tubular member 31, it is not necessary to replace nozzles of different diameters to obtain air jets of different profiles. The operator does not have to do troublesome jobs for changing the wind speed and the breadth of the airflow blown out from the nozzle pipe 30. While the opened area of the apertures is adjusted by circumferentially turning the outer tubular member in the above illustrated embodiment, another example for changing the opened area of the apertures is also possible, for example, by configuring a nozzle pipe in which the outer tubular member is made axially slidable with respect to the inner tubular member and shutter mechanisms are to be shifted in the axial direction with respect to the apertures to adjust the opened area of the apertures. Such a configuration will also bring similar results.

As four apertures 32 of the same size are formed in the circumferential wall of the inner tubular member 31 equally spaced apart from each other in the circumferential direction, the air can be uniformly introduced into the in-between air passage through the apertures 32 so that the air will be blown out from the annular outlet opening of the in-between air passage uniformly in the circumferential direction. While the inner tubular member 31 is formed with four apertures 32 equally spaced apart from each other in the circumferential direction, the number of apertures 32 is not necessarily limited to four in the present invention, but two through eight apertures 32 may be formed equally spaced apart in the circumferential direction, with the same number of shutter mechanisms 35 confronting the apertures 32, respectively. Such a configuration will also bring similar results.

In the above described embodiment, the total amount of the apertures 32 in the circumferential direction (gross aperture rate) at the tapered portion of the inner tubular member 31 is 50% of the circumference. This high circumferential percentage allows sufficient air to flow into the in-between air passage when the shutter mechanisms 35 do not close the apertures 32 so that the air blown out from the nozzle pipe 30 presents a radially broad profile. The gross aperture rate of the apertures 32 is not necessarily limited to 50% of the circumference, but may be between 40% and 50% to achieve substantially the same effect.

While, in the nozzle pipe 30 of the above described embodiment, the inner circumferential wall of the inner tubular member 31 at its inlet opening is coupled to the outer circumferential wall of the blow-off tube 23 at its outlet opening, the coupling structure is not necessarily limited to this configuration, but may be vice versa, namely, the outer circumferential wall of the inner tubular member 31 at its inlet opening may be coupled to the inner circumferential wall of the blow-off tube 23. Alternatively, the inner circumferential wall of the outer tubular member 34 at its inlet opening may be coupled to the outer circumferential wall of the blow-off tube 23 at its outlet opening and the outer circumferential wall of the inner tubular member 31 at its inlet opening is turnably coupled to the inner circumferential wall of the outer tubular member 34 inside its inlet opening. Further, the nozzle pipe 30 may not necessarily be detachably coupled to the blow-off tube 23, but may be integrally fixed to the distal end of the blow-off tube 23. More specifically, the inlet part of either one of the inner tubular member 31 and the outer tubular member 34 may be integrally fixed to the distal end of the blow-off tube 23, and the other of the inner tubular member 31 and the outer tubular member 34 may be slidably, in the circumferential or the axial direction, supported on the one of the inner tubular member 31 and the outer tubular member 34.

Figure 6A:
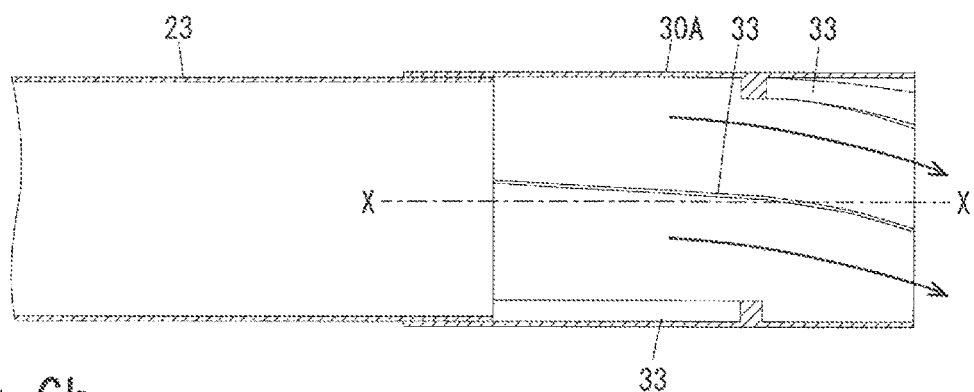
FIG. 6a is a sectional view of a nozzle pipe comprising an outer tubular member and not an inner tubular member taken along the longitudinal central axis thereof.
Figure 6B:
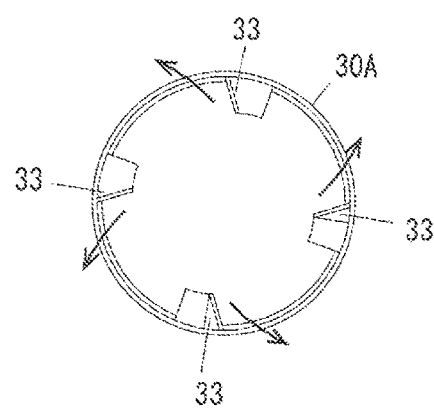
FIG. 6b is an end view of the nozzle pipe of FIG. 6a as seen from the outlet open end thereof.

While the nozzle pipe 30 of the above described embodiment comprises the inner tubular member 31 and the outer tubular member 34 arranged in a coaxial double-tube structure, the present invention is not necessarily limited to this structure, but may be practiced in a single-tube structure as shown in FIG. 6, in which the nozzle pipe comprises an outer tubular member 30A coupled to the distal end of the blow-off tube 23 and the rectifier fins 33 disposed on the inner wall of the single tubular member 30A. Such a configuration will also bring similar results as the aforementioned embodiment. Further, the rectifier fins 33 may not necessarily be inclined at an angle with reference to the longitudinal central axis X-X of the tubular member 30, but may extend straight and parallel to the longitudinal central axis X-X. With such a configuration, the air coming out from the nozzle outlet is given a straight flow orientation. The single tubular member 30A may be detachably coupled to the distal end of the blow-off tube 23, or may be integrally fixed to the distal end of the blow-off tube 23.

While the invention has been described about a nozzle pipe used with a backpack blower apparatus, the invention may be applicable to a hand-held blower apparatus.

What is claimed is:

1. A nozzle pipe to be coupled to a distal open end of an air blow-off tube of a blower apparatus for rectifying airflow coming out from the air blow-off tube, the nozzle pipe comprising:
an outer tubular member having an inlet opening and an outlet opening defining a longitudinal central axis through the inlet opening and the outlet opening, the outer tubular member having an inner wall surface; and
a plurality of parallel rectifier fins, each rectifier fin including a thin plate strip disposed inward from the outer tubular member, standing radially and extending longitudinally from the inlet opening of the outer tubular member to the outlet opening of the outer tubular member, and spaced apart circumferentially from each other, each thin plate strip having two opposite parallel surfaces, said two surfaces exposed to air flow to guide air along said two surfaces, the rectifier fins extending inclined at an angle with respect to the longitudinal axis of the outer tubular member such that the fins are curved circumferentially along the inner wall surface of the outer tubular member as they extend toward the outlet opening of the outer tubular member, the inclination angle of the rectifier fins with reference to the longitudinal direction is between 10 degrees and 30 degrees at the outlet opening of the tubular member,
the plurality of rectifier fins orienting the flowing direction of a peripheral portion of the airflow jetted out from the nozzle pipe into a helically whirling profile and providing a central portion of the airflow jetted out from the nozzle pipe in a straight profile.

2. A nozzle pipe as claimed in claim 1, wherein the rectifier fins extend inclined at an angle with reference to the longitudinal axis such that the fins are curved circumferentially along the inner wall surface as they extend toward the outlet opening.

3. A nozzle pipe as claimed in claim 2, wherein each of the rectifier fins extends inclined at an angle with reference to the longitudinal central axis, the angle increasing as the fin extends nearer to the outlet opening.

4. A nozzle pipe as claimed in claim 2, wherein each of the rectifier fins extends inclined at an angle with reference to the longitudinal axis, the angle being constant throughout the extension of the fin.

5. A nozzle pipe as claimed in claim 1, wherein the plurality of rectifier fins are disposed equally spaced apart circumferentially.

6. A nozzle pipe as claimed in claim 1, wherein the plurality of rectifier fins are three to eight in number.

7. A nozzle pipe as claimed in claim 1, further comprising an inner tubular member coaxially disposed within the outer tubular member, wherein the inner tubular member has a circumferential wall formed with apertures allowing air passage therethrough, an inlet opening adapted to be coupled to the distal open end of the air blow-off tube and an outlet opening formed in parallel with the outlet opening of the outer tubular member, wherein the outer tubular member and the inner tubular member provides a first space therebetween to form a first air passage, and the inner tubular member provides a second space therein to form a second air passage, wherein the rectifier fins are disposed between the outer tubular member and the inner tubular member.

8. A nozzle pipe as claimed in claim 7, wherein the rectifier fins extend inclined at an angle with reference to the longitudinal axis such that the fins are curved circumferentially along the inner wall surface of the outer tubular member as they extend toward the outlet opening of the outer tubular member.

9. A nozzle pipe as claimed in claim 8, wherein each of the rectifier fins extends inclined at an angle with reference to the longitudinal central axis, the angle increasing as the fin extends nearer to the outlet opening.

10. A nozzle pipe as claimed in claim 8, wherein each of the rectifier fins extends inclined at an angle with reference to the longitudinal axis, the angle being constant throughout the extension of the fin.

11. A nozzle pipe as claimed in claim 7, wherein the plurality of rectifier fins are disposed equally spaced apart circumferentially.

12. A nozzle pipe as claimed in claim 7, wherein the plurality of rectifier fins are three to eight in number.

13. A nozzle pipe as claimed in claim 1, wherein the plurality of rectifier fins are configured to rectify a peripheral portion of the airflow by guiding and orienting the direction of the flow of air along the length of the fins without giving substantial resistance to the air flow.

14. A nozzle pipe as claimed in claim 7, wherein the plurality of rectifier fins are configured to provide helically whirling air flow jetting out from between the outlet opening of the outer tubular member and the outlet opening of the inner tubular member.

15. A nozzle pipe as claimed in claim 1, wherein the rectifier fins are configured to provide an outer peripheral portion of the airflow jetted out from the nozzle pipe, directed forwardly and including an expanded breadth peripheral profile.

* * * * *